US012483827B2

(12) United States Patent
Zhou

(10) Patent No.: US 12,483,827 B2
(45) Date of Patent: Nov. 25, 2025

(54) MULTI-DIRECTIONAL WIND NOISE ABATEMENT

(71) Applicant: Meta Platforms Technologies, LLC, Menlo Park, CA (US)

(72) Inventor: Limin Zhou, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 544 days.

(21) Appl. No.: 18/086,446

(22) Filed: Dec. 21, 2022

(65) Prior Publication Data

US 2023/0396920 A1 Dec. 7, 2023

Related U.S. Application Data

(60) Provisional application No. 63/349,923, filed on Jun. 7, 2022.

(51) Int. Cl.
*H04R 3/00* (2006.01)
*H04R 1/40* (2006.01)

(52) U.S. Cl.
CPC ............. *H04R 3/005* (2013.01); *H04R 1/406* (2013.01); *H04R 2201/403* (2013.01); *H04R 2499/11* (2013.01)

(58) Field of Classification Search
CPC ........ H04R 1/1083; H04R 1/34; H04R 5/033; H04R 1/342; H04R 3/005; H04R 2460/13; H04R 1/406; H04R 2410/07; G10K 11/00; G10K 11/16
See application file for complete search history.

(56) References Cited

U.S. PATENT DOCUMENTS

| | | | | |
|---|---|---|---|---|
| 3,831,561 | A | 8/1974 | Yamamoto et al. | |
| 6,518,719 | B1 * | 2/2003 | Suzuki | B24B 49/10 318/632 |
| 7,584,820 | B2 * | 9/2009 | Parker | H04R 1/2857 181/155 |
| 7,916,887 | B2 * | 3/2011 | Cleckler | H04R 1/086 381/189 |
| 9,343,056 | B1 | 5/2016 | Goodwin | |
| 9,807,530 | B1 | 10/2017 | Tisch et al. | |
| 11,206,482 | B2 * | 12/2021 | Miller | G10L 21/0208 |

(Continued)

FOREIGN PATENT DOCUMENTS

| | | |
|---|---|---|
| JP | 4454362 B2 | 4/2010 |
| JP | 5974288 B2 | 8/2016 |

(Continued)

*Primary Examiner* — Rasha S Al Aubaidi
(74) *Attorney, Agent, or Firm* — Greenberg Traurig, LLP

(57) ABSTRACT

An acoustic device for use in a wearable device (e.g., smart watch) is described. The acoustic device includes a curved primary audio waveguide and a plurality of secondary waveguides. The curved primary waveguide has two ports that open to a local area on opposite ends of the primary audio waveguide. The primary waveguide is coupled to a plurality of secondary audio waveguides. Each secondary audio waveguide couples a different acoustic sensor to the primary audio waveguide. A controller can select a signal from an acoustic sensor, of the at least two acoustic sensors, having the least amount of wind noise. Additionally, in some embodiments, when there is minimal wind noise, the at least two acoustic sensors may be used for beamforming.

20 Claims, 7 Drawing Sheets

(56) References Cited

U.S. PATENT DOCUMENTS

| | | | |
|---|---|---|---|
| 11,245,982 | B2 | 2/2022 | Tisch et al. |
| 2021/0400381 | A1 | 12/2021 | Tisch et al. |

FOREIGN PATENT DOCUMENTS

| | | | |
|---|---|---|---|
| JP | 6078781 | B2 | 2/2017 |
| JP | 6101923 | B2 | 3/2017 |
| JP | 6229138 | B2 | 11/2017 |

* cited by examiner

MULTI-DIRECTIONAL WIND NOISE ABATEMENT

CROSS-REFERENCE TO RELATED APPLICATIONS

This application claims the benefit of U.S. Provisional Application No. 63/349,923, filed Jun. 7, 2022, which is incorporated by reference in its entirety.

FIELD OF THE INVENTION

This disclosure relates generally to acoustic sensors, and more specifically to acoustic devices for multi-directional wind noise abatement.

BACKGROUND

Traditional porting designs for air-conduct microphones include cascaded straight tubes with a waveguide to the outside world and a microphone at the other end. This architecture exposes the microphone to wind noise because the wind turbulence energy is fully picked up by the microphone once the wind enters the ports. In addition, the limited space in wearable products results in challenging positioning in terms of wind noise mitigation performance. Thirdly, once the port is blocked by dust or debris, the acoustic performance is also significantly degraded.

SUMMARY

An acoustic device is configured to mitigate wind noise, for use in a wearable device. The acoustic device includes a curved primary waveguide, and a plurality of secondary waveguides. The acoustic device includes a curved primary waveguide that has two ports that open to a local area on opposite ends of the primary audio waveguide. The primary waveguide is coupled to a plurality of secondary audio waveguides. Each secondary audio waveguide couples a different acoustic sensor to the primary audio waveguide. An audio controller is configured to select a signal from an acoustic sensor, of the two or more acoustic sensors, having the least amount of wind noise. Additionally, in some embodiments, when there is minimal wind noise, the two or more acoustic sensors may be used for beamforming.

Figure 1A:
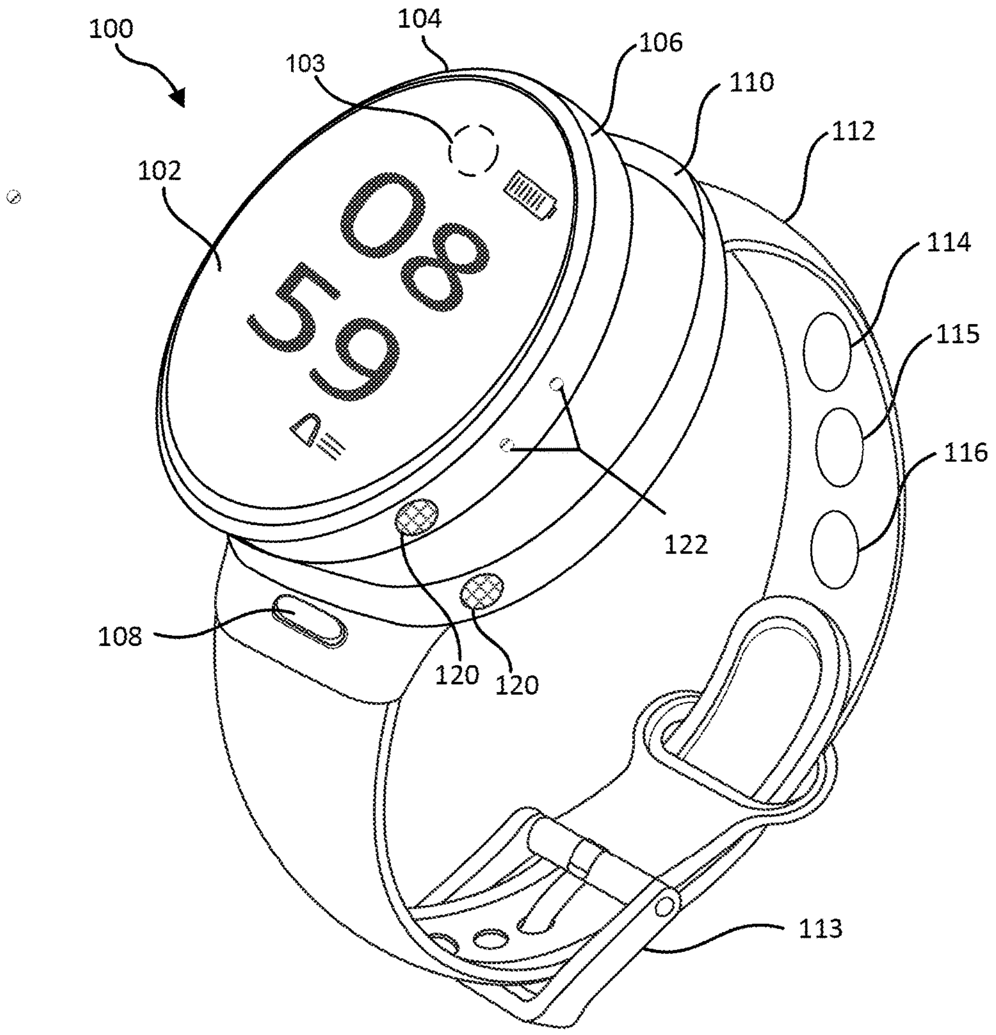
FIG. 1A is a perspective view of an example wristband system, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Described herein are embodiments for multi-directional wind noise abatement. An acoustic device captures sounds emitted from one or more sound sources in a local area. The acoustic device may be integrated into various devices. Devices may include, e.g., wearable devices (e.g., smart watches, headsets, etc.), phones, tablets, etc. It is particularly useful in experiences and/or devices in which wind can be an issue (e.g., sailing, running, hiking, walking, being outdoors on a windy day, etc.). The acoustic device is configured to detect sound and convert the detected sound into an electronic format (analog or digital). The acoustic device is configured to mitigate noise from airflow, such as turbulent pressure waves (e.g., wind). The acoustic device includes a curved primary waveguide, and a plurality of secondary waveguides.

The curved primary waveguide is configured to transport sound pressure waves to two or more acoustic sensors. The primary waveguide includes a first end and a second end. The first end includes a first port to the local area, and the second end includes a second port to the local area. A plurality of secondary waveguides is coupled to portions of the curved primary waveguide, the plurality of secondary waveguides configured to transport sound from the curved primary waveguide to a plurality of acoustic sensors. Each secondary waveguide of the plurality of secondary waveguides includes a first end and a second end. The first end is coupled to a respective portion of the curved primary waveguide and the second end of secondary waveguide includes a respective acoustic sensor.

Based in part on orientation of the acoustic device relative to wind direction, at least one of the ports of the primary waveguide acts as an input port and receives airflow. The received airflow may include, e.g., sound pressure waves from a sound source and turbulent pressure waves (e.g., wind). The airflow travels through the curved primary waveguide toward an output port (i.e., the opposite port of the entrance port). As the airflow travels through the curved primary waveguide, a portion of the sound pressure waves and turbulent pressure waves branch off into the secondary waveguides and are detected by their respective acoustic sensor, while the remaining portion of the airflow travels to and exits at the output port. The secondary waveguides are positioned such that most of the sound pressure waves and a relatively small amount of the turbulent pressure waves propagate from the curved primary waveguide into the secondary waveguides, with most of the turbulent pressure waves proceeding through about the output port. This directs a portion of turbulent pressure waves away from the plurality of acoustic sensors, mitigating the noise captured by the plurality of acoustic sensors caused by the airflow, while directing audio to the acoustic sensors via the plurality of secondary waveguides.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

The acoustic device may be integrated in wearable devices. Wearable devices may be configured to be worn on a user's body part, such as a user's wrist or arm. Such wearable devices may be configured to perform various functions. A wristband system may be an electronic device worn on a user's wrist that performs functions such as delivering content to the user, executing social media applications, executing artificial-reality applications, messaging, web browsing, sensing ambient conditions, interfacing with head-mounted displays, monitoring the health status associated with the user, etc.

The present disclosure details systems, devices, and methods related to a wristband system that includes a watch band that detachably couples to a watch body. The watch body may include a coupling mechanism for electrically and mechanically coupling the watch body to the watch band. The wristband system may have a split architecture that allows the watch band and the watch body to operate both independently and in communication with one another. The mechanical architecture may include a coupling mechanism on the watch band and/or the watch body that allows a user to conveniently attach and detach the watch body from the watch band.

The wristband system may be used in conjunction with an artificial-reality (AR) system. Sensors of the wristband system (e.g., image sensors, inertial measurement unit (IMU), etc.) may be used to enhance an AR application running on the AR system. Further, the watch band may include sensors that measure biometrics of the user. For example, the watch band may include neuromuscular sensors disposed on an inside surface of the watch band contacting the user that detects the muscle intentions of the user. The AR system may include a head-mounted display that is configured to enhance a user interaction with an object within the AR environment based on the muscle intentions of the user. Signals sensed by the neuromuscular sensors may be processed and used to provide a user with an enhanced interaction with a physical object and/or a virtual object in an AR environment. For example, the AR system may operate in conjunction with the neuromuscular sensors to overlay one or more visual indicators on or near an object within the AR environment such that the user could perform "enhanced" or "augmented" interactions with the object.

In some examples, the wristband system may have sufficient processing capabilities (e.g., CPU, memory, bandwidth, battery power, etc.) to offload computing tasks from a head-mounted display (HMD) to the wristband system. Methods of the present disclosure may determine a computing task of the HMD that is suitable for processing on available computing resources of the watch body. The computing task to be offloaded may be determined based on computing requirements, power consumption, battery charge level, latency requirements, or a combination thereof. The tasks offloaded to the watch body may include processing images captured by image sensors of the HMD, a location determining task, a neural network training task, etc. The watch body may process the computing task and return the results to the HMD. In some examples, offloading computing tasks from the HMD to the wristband system may reduce heat generation, reduce power consumption and/or decrease computing task execution latency in the HMD.

In some examples, a head-mounted display (HMD) may have sufficient processing capabilities (e.g., central processing unit (CPU), memory, bandwidth, battery power, etc.) to offload computing tasks from the wristband system (e.g., a watch body, a watch band) to the HMD. Methods of the present disclosure may include determining a computing task of the wristband system that is suitable for processing on available computing resources of the HMD. By way of example, the computing task to be offloaded may be determined based on computing requirements, power consumption, battery charge level, latency requirements, or a combination thereof. The tasks offloaded to the HMD may include processing images captured by image sensors of the wristband system, a location determining task, a neural network training task, etc. The HMD may process the computing task(s) and return the results to the wristband system. In some examples, offloading computing tasks from the wristband system to the HMD may reduce heat generation, reduce power consumption and/or decrease computing task execution latency in the wristband system.

In some examples, the wristband system may include multiple electronic devices including, without limitation, a smartphone, a server, a HMD, a laptop computer, a desktop computer, a gaming system, Internet of things devices, etc. Such electronic devices may communicate with the wristband system (e.g., via a personal area network). The wristband system may have sufficient processing capabilities (e.g., CPU, memory, bandwidth, battery power, etc.) to offload computing tasks from each of the multiple electronic devices to the wristband system. Additionally or alternatively, each of the multiple electronic devices may have sufficient processing capabilities (e.g., CPU, memory, bandwidth, battery power, etc.) to offload computing tasks from the wristband system to the electronic device(s).

FIG. 1A is a perspective view of an example wristband system, according to at least one embodiment of the present disclosure. Watch body 104 and watch band 112 may have a substantially rectangular or circular shape and may be configured to allow a user to wear wristband system 100 on a body part (e.g., a wrist). Wristband system 100 may include a retaining mechanism 113 (e.g., a buckle, a hook and loop fastener, etc.) for securing watch band 112 to the user's wrist. Wristband system 100 may also include a coupling mechanism 106 for detachably coupling watch body 104 to watch band 112.

Wristband system 100 may perform various functions associated with the user as described above with reference to FIGS. 1A and 1B. Functions executed by wristband system 100 may include, without limitation, display of visual content to the user (e.g., visual content displayed on display screen 102), sensing user input (e.g., sensing a touch on button 108, sensing biometric data on sensor 114, sensing neuromuscular signals on neuromuscular sensor 115, etc.), messaging (e.g., text, speech, video, etc.), image capture (e.g., with a front-facing image sensor 103 and/or a rear-facing image sensor), wireless communications (e.g., cellular, near field, WiFi, personal area network, etc.), location determination, financial transactions, providing haptic feedback, alarms, notifications, biometric authentication, health monitoring, sleep monitoring, etc. These functions may be executed independently in watch body 104, independently in watch band 112, and/or in communication between watch body 104 and watch band 112. Functions may be executed on wristband system 100 in conjunction with an artificial-reality system.

Watch band 112 may be configured to be worn by a user such that an inner surface of watch band 112 may be in contact with the user's skin. When worn by a user, sensor 114 may be in contact with the user's skin. Sensor 114 may be a biosensor that senses a user's heart rate, saturated oxygen level, temperature, sweat level, muscle intentions, or a combination thereof. Watch band 112 may include multiple sensors 114 that may be distributed on an inside and/or an outside surface of watch band 112. Additionally or alternatively, watch body 104 may include the same or different sensors than watch band 112. For example, multiple sensors may be distributed on an inside and/or an outside surface of watch body 104. As described below with reference to FIG. 2, watch body 104 may include, without limitation, front-facing image sensor, rear-facing image sensor, a biometric sensor, an IMU, a heart rate sensor, a saturated oxygen sensor, a neuromuscular sensor(s), an altimeter sensor, a temperature sensor, a bioimpedance sensor, a pedometer sensor, an optical sensor, a touch sensor, a sweat sensor, etc. Sensor 114 may also include a sensor that provides data about a user's environment including a user's motion (e.g., an IMU), altitude, location, orientation, gait, or a combination thereof. Sensor 114 may also include a light sensor (e.g., an infrared light sensor, a visible light sensor) that is configured to track a position and/or motion of watch body 104 and/or watch band 112. Watch band 112 may transmit the data acquired by sensor 114 to watch body 104 using a wired communication method (e.g., a UART, a USB transceiver, etc.) and/or a wireless communication method (e.g., near field communication, Bluetooth™, etc.). Watch band 112 may be configured to operate (e.g., to collect data using sensor 114) independent of whether watch body 104 is coupled to or decoupled from watch band 112.

Watch band 112 and/or watch body 104 may include a haptic device 116 (e.g., a vibratory haptic actuator) that is configured to provide haptic feedback (e.g., a cutaneous and/or kinesthetic sensation, etc.) to the user's skin. Sensor 114 and/or haptic device 116 may be configured to operate in conjunction with multiple applications including, without limitation, health monitoring, social media, game playing, and artificial reality.

In some examples, watch band 112 may include a neuromuscular sensor 115 (e.g., an electromyography (EMG) sensor, a mechanomyogram (MMG) sensor, a sonomyography (SMG) sensor, etc.). Neuromuscular sensor 115 may sense a user's muscle intention. The sensed muscle intention may be transmitted to an artificial-reality (AR) system to perform an action in an associated artificial-reality environment, such as to control the motion of a virtual device displayed to the user. Further, the artificial-reality system may provide haptic feedback to the user in coordination with the artificial-reality application via haptic device 116.

Signals from neuromuscular sensor 115 may be used to provide a user with an enhanced interaction with a physical object and/or a virtual object in an AR environment generated by an AR system. Signals from neuromuscular sensor 115 may be obtained (e.g., sensed and recorded) by one or more neuromuscular sensors 115 of watch band 112. Although FIG. 1A shows one neuromuscular sensor 115, watch band 112 may include a plurality of neuromuscular sensors 115 arranged circumferentially on an inside surface of watch band 112 such that the plurality of neuromuscular sensors 115 contact the skin of the user. Watch band 112 may include a plurality of neuromuscular sensors 115 arranged circumferentially on an inside surface of watch band 112. Neuromuscular sensor 115 may sense and record neuromuscular signals from the user as the user performs muscular activations (e.g., movements, gestures, etc.). The muscular activations performed by the user may include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user may include symbolic gestures (e.g., gestures mapped to other gestures, interactions, or commands, for example, based on a gesture vocabulary that specifies the mapping of gestures to commands).

An AR system may operate in conjunction with neuromuscular sensor 115 to overlay one or more visual indicators on or near a physical and/or virtual object within the AR environment. The visual indicators may instruct the user that the physical and/or virtual object (e.g., a sporting object, a gaming object) is an object that has a set of virtual controls associated with it such that, if the user interacted with the object (e.g., by picking it up), the user could perform one or more "enhanced" or "augmented" interactions with the object. The visual indicator(s) may indicate that it is an object capable of enhanced interaction.

In another example, an indication of a set of virtual controls for the physical or virtual object, which may be activated by the user to control the object, may be overlaid on or displayed near the object in the AR environment. The user may interact with the indicator(s) of the set of virtual controls by, for example, performing a muscular activation to select one of the virtual controls. Neuromuscular sensor 115 may sense the muscular activation and in response to the interaction of the user with the indicator(s) of the set of virtual controls, information relating to an interaction with the object may be determined. For example, if the object is a virtual sword (e.g., a sword used in an AR game), the user may perform a gesture to select the virtual sword's functionality, such that, when the user picks up the virtual sword, it may be used to play a game within the AR environment.

Information relating to an interaction of the user with the physical and/or virtual object may be determined based on the neuromuscular signals obtained by the neuromuscular sensor 115 and/or information derived from the neuromuscular signals (e.g., information based on analog and/or digital processing of the neuromuscular signals). Additionally, or alternatively, auxiliary signals from one or more auxiliary device(s) (e.g., front-facing image sensor, rear-facing image sensor, IMU 242, audio system 208, heart rate sensor 258, image sensors of the AR systems, etc.) may supplement the neuromuscular signals to determine the information relating to the interaction of the user with the physical and/or virtual object. For example, neuromuscular sensor 115 may determine how tightly the user is grasping the physical and/or virtual object, and a control signal may be sent to the AR system based on an amount of grasping force being applied to the physical object. Continuing with the example above, the object may be a virtual sword, and applying different amounts of grasping and/or swinging force to the virtual sword (e.g., using data gathered by the IMU 242) may change (e.g., enhance) the functionality of the virtual sword while interacting with a virtual game in the AR environment.

Wristband system 100 may include a coupling mechanism for detachably coupling watch body 104 to watch band 112. A user may detach watch body 104 from watch band 112 in order to reduce the encumbrance of wristband system 100 to the user. Wristband system 100 may include a watch body coupling mechanism(s) 106 and/or watch band coupling mechanism(s) 110 (e.g., a cradle, a tracker band, a support base, a clasp). Any method or coupling mechanism may be used for detachably coupling watch body 104 to watch band 112. A user may perform any type of motion to couple watch body 104 to watch band 112 and to decouple watch body 104 from watch band 112. For example, a user may twist, slide, turn, push, pull, or rotate watch body 104 relative to watch band 112, or a combination thereof, to attach watch body 104 to watch band 112 and to detach watch body 104 from watch band 112.

As shown in the example of FIG. 1A, watch band coupling mechanism 110 may include a type of frame or shell that allows watch body coupling mechanism 106 to be retained within watch band coupling mechanism 110. Watch body 104 may be detachably coupled to watch band 112 through a friction fit, magnetic coupling, a rotation-based connector, a shear-pin coupler, a retention spring, one or more magnets, a clip, a pin shaft, a hook and loop fastener, or a combination thereof. In some examples, watch body 104 may be decoupled from watch band 112 by actuation of release mechanism 120. Release mechanism 120 may include, without limitation, a button, a knob, a plunger, a handle, a lever, a fastener, a clasp, a dial, a latch, or a combination thereof.

Wristband system 100 may include a single release mechanism 120 or multiple release mechanisms 120 (e.g., two release mechanisms 120 positioned on opposing sides of wristband system 100). As shown in FIG. 1A, release mechanism 120 may be positioned on watch body 104 and/or watch band coupling mechanism 110. Although FIG. 1A shows release mechanism 120 positioned at a corner of watch body 104 and at a corner of watch band coupling mechanism 110, release mechanism 120 may be positioned anywhere on watch body 104 and/or watch band coupling mechanism 110 that is convenient for a user of wristband system 100 to actuate. A user of wristband system 100 may actuate release mechanism 120 by pushing, turning, lifting, depressing, shifting, or performing other actions on release mechanism 120. Actuation of release mechanism 120 may release (e.g., decouple) watch body 104 from watch band coupling mechanism 110 and watch band 112 allowing the user to use watch body 104 independently from watch band 112. For example, decoupling watch body 104 from watch band 112 may allow the user to capture images using rear-facing image sensor.

Figure 1B:
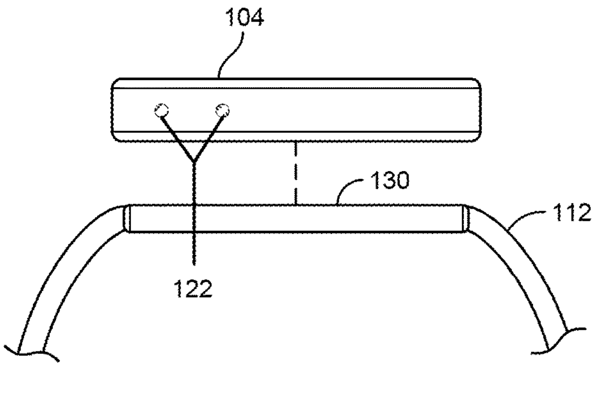
FIG. 1B is a side view of another example wristband system, in accordance with one or more embodiments.
Figure 1C:
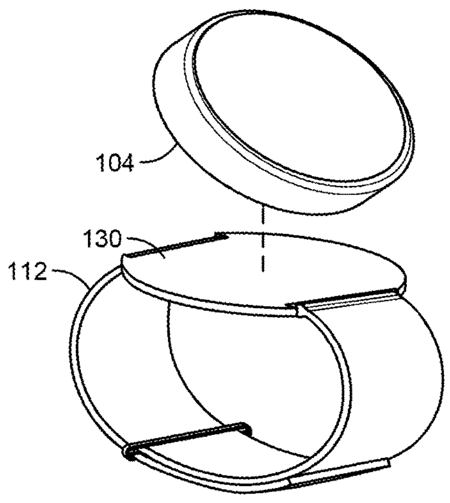
FIG. 1C is a perspective view of another example wristband system, in accordance with one or more embodiments.

FIG. 1B is a side view and FIG. 1C is a perspective view of another example wristband system, in accordance with one or more embodiments. The wristband systems of FIGS. 1B and 1C may include a watch body interface 130. Watch body 104 may be detachably coupled to watch body interface 130. Watch body 104 may be detachably coupled to watch body interface 130 as described in detail with reference to FIG. 1A. Watch body 104 may be detachably coupled to watch body interface 130 through a friction fit, magnetic coupling, a rotation-based connector, a shear-pin coupler, a retention spring, one or more magnets, a clip, a pin shaft, a hook and loop fastener, or a combination thereof.

In some examples, watch body 104 may be decoupled from watch body interface 130 by actuation of a release mechanism. The release mechanism may include, without limitation, a button, a knob, a plunger, a handle, a lever, a fastener, a clasp, a dial, a latch, or a combination thereof. In some examples, the wristband system functions may be executed independently in watch body 104, independently in watch body interface 130, and/or in communication between watch body 104 and watch body interface 130. Watch body interface 130 may be configured to operate independently (e.g., execute functions independently) from watch body 104. Additionally or alternatively, watch body 104 may be configured to operate independently (e.g., execute functions independently) from watch body interface 130. The watch body interface 130 and/or watch body 104 may each include the independent resources required to independently execute functions. For example, watch body interface 130 and/or watch body 104 may each include a power source (e.g., a battery 228), a memory, data storage, a processor (e.g., a CPU), communications, a light source, and/or input/output devices.

In this example, watch body interface 130 may include all of the electronic components of watch band 112. In additional examples, one or more electronic components may be housed in watch body interface 130 and one or more other electronic components may be housed in portions of watch band 112 away from watch body interface 130.

The wristband system 100 may also include an audio system 208. The audio system 208 provides audio content. The audio system 208 includes one or more speakers, a sensor array, and an audio controller. In various embodiments, the audio system 208 further includes an acoustic device. However, in other embodiments, the audio system 208 may include different and/or additional components. Similarly, in some cases, functionality described with reference to the components of the audio system 208 can be distributed among the components in a different manner than is described here. For example, some or all of the functions of the controller may be performed by a remote server.

The sensor array detects sounds within the local area of the wristband system 100. The sensor array includes a plurality of acoustic sensors. An acoustic sensor captures sounds emitted from one or more sound sources in the local area (e.g., a room). Each acoustic sensor is configured to detect sound and convert the detected sound into an electronic format (analog or digital). The acoustic sensors may be acoustic wave sensors, microphones, sound transducers, or similar sensors that are suitable for detecting sounds.

The acoustic device is configured to mitigate noise from airflow, such as wind, captured by a plurality of acoustic sensors. As further described below in conjunction with FIG. 4 and FIGS. 5A through 5D, an acoustic device includes a curved primary waveguide, and a plurality of secondary waveguides that are coupled to each other. The curved primary waveguide having a first and second end, the first end includes a first port to the local area, and the second end includes a second port to the local area. The ports 122 allowing airflow to enter or exit the acoustic device, based in part on the orientation of the acoustic device with respect to wind direction. In some embodiments, one or more port 122 openings may have a mesh.

A plurality of secondary waveguides is coupled to portions of the curved primary waveguide, the plurality of secondary waveguides configured to transport sound from the curved primary waveguide to a plurality of acoustic sensor. Each secondary waveguide of the plurality of secondary waveguides includes a first end and a second end. The first end is coupled to a respective portion of the curved primary waveguide and the second end of secondary waveguide includes a respective acoustic sensor.

Based in part on orientation of the acoustic device relative to wind direction, at least one of the ports of the primary waveguide acts as an input port and receives airflow. The received airflow may include, e.g., sound pressure waves from a sound source and turbulent pressure waves (e.g., wind). The airflow travels through the curved primary waveguide toward an output port (i.e., the opposite port of the entrance port). As the airflow travels through the curved primary waveguide, a portion of the sound pressure waves and turbulent pressure waves branch off into the secondary waveguides and are detected by their respective acoustic sensors, while the remaining portion of the airflow travels to and exits at the output port. The secondary waveguides are positioned such that most of the sound pressure waves and a relatively small amount of the turbulent pressure waves propagate from the curved primary waveguide into the secondary waveguides, with most of the turbulent pressure waves proceeding through about the output port. This directs a portion of turbulent pressure waves away from the plurality of acoustic sensors, mitigating the noise captured by the plurality of acoustic sensors caused by the airflow, while directing audio to the acoustic sensors via the plurality of secondary waveguides.

In the illustrated embodiments, the acoustic device is located inside a watch body 104, with ports 122 connected to a local area. In other embodiments, the acoustic device may be placed on an exterior surface of the wristband system, placed on an interior surface of the wristband system 100, separate from the wristband system 100 (e.g., part of some other device), or some combination thereof. The number and/or locations of ports of acoustic devices may be different from what is shown in FIGS. 1A and 1B. For example, the number of acoustic detection locations may be increased to increase the amount of audio information collected and the sensitivity and/or accuracy of the information. The acoustic detection locations may be oriented such that the acoustic sensor is able to detect sounds in a wide range of directions surrounding the user wearing the wristband system 100. The acoustic device will be discussed in further detail in FIG. 4, and FIGS. 5A through 5D.

Figure 2:
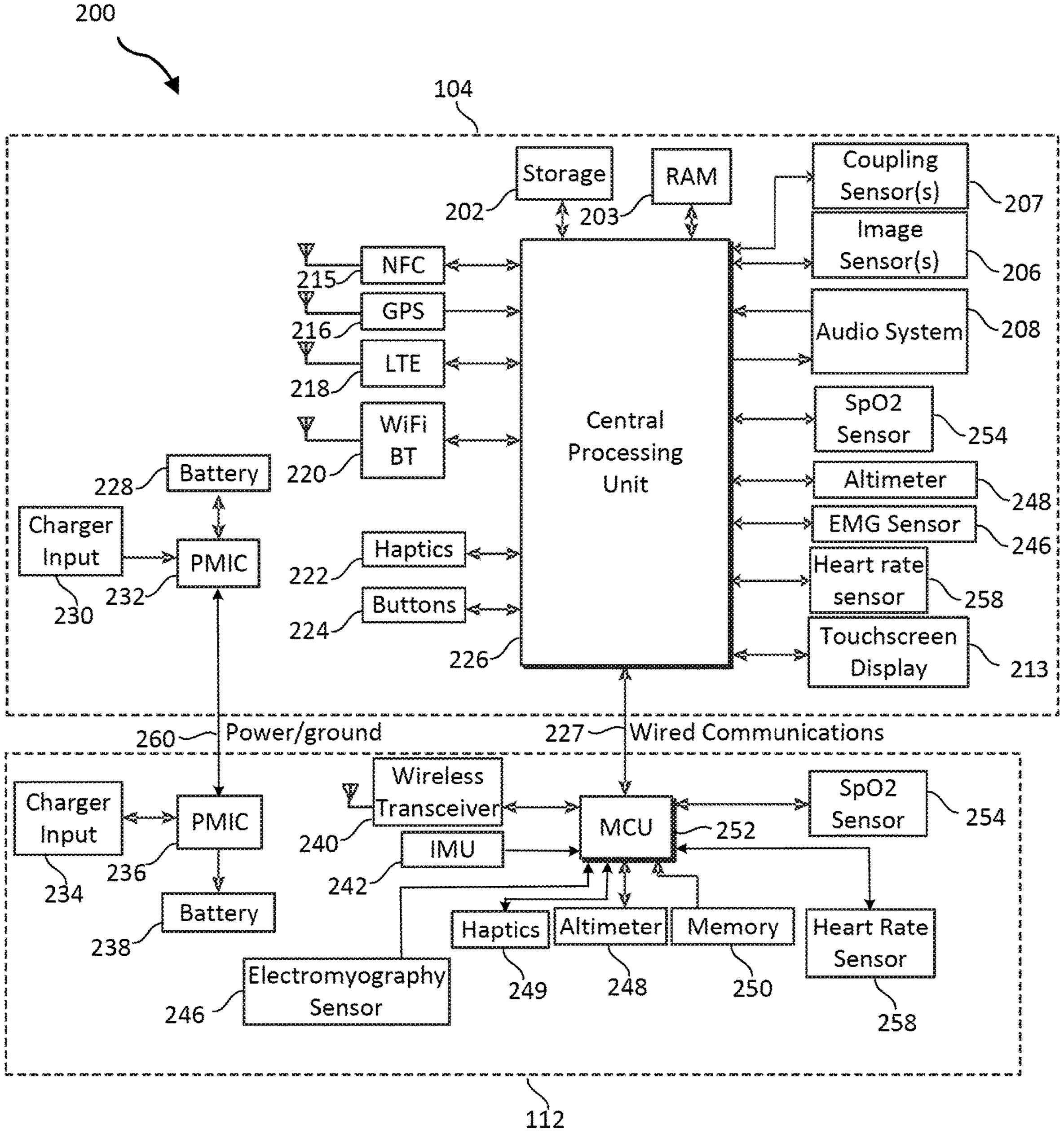
FIG. 2 is an example block diagram of a wristband system, in accordance with one or more embodiments.

FIG. 2 is a block diagram of an example wristband system 200, according to at least one embodiment of the present disclosure. Referring to FIG. 2, wristband system 100 may have a split architecture (e.g., a split mechanical architecture, a split electrical architecture) between a watch body 104 and a watch band 112, as discussed above with reference to FIGS. 1A through 1C. Each of watch body 104 and watch band 112 may have a power source, a processor, a memory, sensors, a charging device, and a communications device that enables each of watch body 104 and watch band 112 to execute computing, controlling, communication, and sensing functions independently in watch body 104, independently in watch band 112, and/or in communication between watch body 104 and watch band 112.

For example, watch body 104 may include an audio system 208, battery 228, CPU 226, storage 202, heart rate sensor 258, EMG sensor 246, SpO2 sensor 254, altimeter 248, random access memory 203, charging input 230 and communication devices NFC 215, LTE 218, and WiFi/Bluetooth™ 220. Similarly, watch band 112 may include battery 238, microcontroller unit 252, memory 250, heart rate sensor 258, EMG sensor 246, SpO2 sensor 254, altimeter 248, charging input 234 and wireless transceiver 240. In some examples, a level of functionality of at least one of watch band 112 or watch body 104 may be modified when watch body 104 is detached from watch band 112. The level of functionality that may be modified may include the functionality of at least one sensor (e.g., heart rate sensor 258, EMG sensor 246, etc.). Each of watch body 104 and watch band 112 may execute instructions stored in storage 202 and memory 250 respectively that enables at least one sensor (e.g., heart rate sensor 258, EMG sensor 246, etc.) in watch band 112 to acquire data when watch band 112 is detached from watch body 104 and when watch band 112 is attached to watch body 104.

Watch body 104 and watch band 112 may further execute instructions stored in storage 202 and memory 250 respectively that enables watch band 112 to transmit the acquired data to watch body 104 (or an HMD) using wired communications 227 and/or wireless transceiver 240. As described above with reference to FIGS. 1A and 1B, wristband system 200 may include a user interface. For example, watch body 104 may display visual content to a user on touchscreen display 213 and play audio content through the audio system 208. Watch body 104 may receive user inputs such as audio input from sensor array and touch input from buttons 224. Watch body 104 may also receive inputs associated with a user's location and/or surroundings. For example, watch body 104 may receive location information from GPS 216 and/or altimeter 248 of watch band 112.

Watch body 104 may receive image data from at least one image sensor (e.g., a camera). Image sensor may include front-facing image sensor and/or rear-facing image sensor. Front-facing image sensor and/or rear-facing image sensor may capture wide-angle images of the area surrounding front-facing image sensor and/or rear-facing image sensor such as hemispherical images (e.g., at least hemispherical, substantially spherical, etc.), 180-degree images, 360-degree area images, panoramic images, ultra-wide area images, or a combination thereof. In some examples, front-facing image sensor and/or rear-facing image sensor may be configured to capture images having a range between 45 degrees and 360 degrees. Certain input information received by watch body 104 (e.g., user inputs, etc.) may be communicated to watch band 112. Similarly, certain input information (e.g., acquired sensor data, neuromuscular sensor data, etc.) received by watch band 112 may be communicated to watch body 104.

Watch body 104 and watch band 112 may receive a charge using a variety of techniques. In some embodiments, watch body 104 and watch band 112 may use a wired charging assembly (e.g., power cords) to receive the charge. Alternatively or in addition, watch body 104 and/or watch band 112 may be configured for wireless charging. For example, a portable charging device may be designed to mate with a portion of watch body 104 and/or watch band 112 and wirelessly deliver usable power to a battery 238 of watch body 104 and/or watch band 112.

Watch body 104 and watch band 112 may have independent power and charging sources to enable each to operate independently. Watch body 104 and watch band 112 may also share power (e.g., one may charge the other) via power management IC 232 in watch body 104 and power management IC 236 in watch band 112. Power management IC 232 and power management IC 236 may share power over power and ground conductors and/or over wireless charging antennas.

Wristband system 200 may operate in conjunction with a health monitoring application that acquires biometric and activity information associated with the user. The health monitoring application may be designed to provide information to a user that is related to the user's health. For example, wristband system 200 may monitor a user's physical activity by acquiring data from IMU 242 while simultaneously monitoring the user's heart rate via heart rate sensor 258 and saturated blood oxygen levels via SpO2 sensor 254. CPU 226 may process the acquired data and display health related information to the user on touchscreen display 213.

Wristband system 200 may detect when watch body 104 and watch band 112 are connected to one another (e.g., mechanically connected and/or electrically connected) or detached from one another. For example, pin(s), power/ground connections 260, wireless transceiver 240, and/or wired communications 227, may detect whether watch body 104 and watch band 112 are mechanically and/or electrically connected to one another (e.g., detecting a disconnect between the one or more electrical contacts of power/ground connections 260 and/or wired communications 227). In some examples, when watch body 104 and watch band 112 are mechanically and/or electrically disconnected from one another, watch body 104 and/or watch band 112 may operate with modified level of functionality (e.g., reduced functionality) as compared to when watch body 104 and watch band 112 are mechanically and/or electrically connected to one another. The modified level of functionality (e.g., switching from full functionality to reduced functionality and from reduced functionality to full functionality) may occur automatically (e.g., without user intervention) when wristband system 200 determines that watch body 104 and watch band 112 are mechanically and/or electrically disconnected from one another and connected to each other, respectively.

Modifying the level of functionality (e.g., reducing the functionality in watch body 104 and/or watch band 112) may reduce power consumption in battery 238 and/or battery 238. For example, any of the sensors (e.g., heart rate sensor 258, EMG sensor 246, SpO2 sensor 254, altimeter 248, etc.), processors (e.g., CPU 226, microcontroller unit 252, etc.), communications elements (e.g., NFC 215, GPS 216, LTE 218, WiFi/Bluetooth™ 220, etc.), or actuators (e.g., haptics 222, 249, etc.) may reduce functionality and/or power consumption (e.g., enter a sleep mode) when watch body 104 and watch band 112 are mechanically and/or electrically disconnected from one another. Watch body 104 and watch band 112 may return to full functionality when watch body 104 and watch band 112 are mechanically and/or electrically connected to one another. The level of functionality of each of the sensors, processors, actuators, and memory may be independently controlled.

As described above, wristband system 200 may detect when watch body 104 and watch band 112 are coupled to one another (e.g., mechanically connected and/or electrically connected) or decoupled from one another. In some examples, watch body 104 may modify a level of functionality (e.g., activate and/or deactivate certain functions) based on whether watch body 104 is coupled to watch band 112. For example, CPU 226 may execute instructions that detect when watch body 104 and watch band 112 are coupled to one another and activate front-facing image sensor. CPU 226 may activate front-facing image sensor based on receiving user input (e.g., a user touch input from touchscreen display 213, a user voice command from audio system 208, a user gesture recognition input from EMG sensor 246, etc.).

When CPU 226 detects that watch body 104 and watch band 112 are decoupled from one another, CPU 226 may modify a level of functionality (e.g., activate and/or deactivate additional functions). For example, CPU 226 may detect when watch body 104 and watch band 112 are decoupled from one another and activate rear-facing image sensor. CPU 226 may activate rear-facing image sensor automatically (e.g., without user input) and/or based on receiving user input (e.g., a touch input, a voice input, an intention detection, etc.). Automatically activating rear-facing image sensor may allow a user to take wide-angle images without having to provide user input to activate rear-facing image sensor.

In some examples, rear-facing image sensor may be activated based on an image capture criterion (e.g., an image quality, an image resolution, etc.). For example, rear-facing image sensor may receive an image (e.g., a test image). CPU 226 and/or rear-facing image sensor may analyze the received test image data and determine whether the test image data satisfies the image capture criterion (e.g., the image quality exceeds a threshold, the image resolution exceeds a threshold, etc.). Rear-facing image sensor may be activated when the test image data satisfies the image capture criterion. Additionally or alternatively, rear-facing image sensor may be deactivated when the test image data fails to satisfy the image capture criterion.

In some examples, CPU 226 may detect when watch body 104 is coupled to watch band 112 and deactivate rear-facing image sensor. CPU 226 may deactivate rear-facing image sensor automatically (e.g., without user input) and/or based on receiving user input (e.g., a touch input, a voice input, an intention detection, etc.). Deactivating rear-facing image sensor may automatically (e.g., without user input) reduce the power consumption of watch body 104 and increase the battery 238 charge time in watch body 104. In some examples, wristband system 200 may include a coupling sensor 207 that senses whether watch body 104 is coupled to or decoupled from watch band 112. Coupling sensor 207 may be included in any of watch body 104, watch band 112, or watch band coupling mechanism 110 of FIG. 1A. Coupling sensor 207 (e.g., a proximity sensor) may include, without limitation, an inductive proximity sensor, a limit switch, an optical proximity sensor, a capacitive proximity sensor, a magnetic proximity sensor, an ultrasonic proximity sensor, or a combination thereof. CPU 226 may detect when watch body 104 is coupled to watch band 112 or decoupled from watch band 112 by reading the status of coupling sensor 207. The audio system 208 is discussed in further detail in FIG. 3 through FIG. 4.

Figure 3:
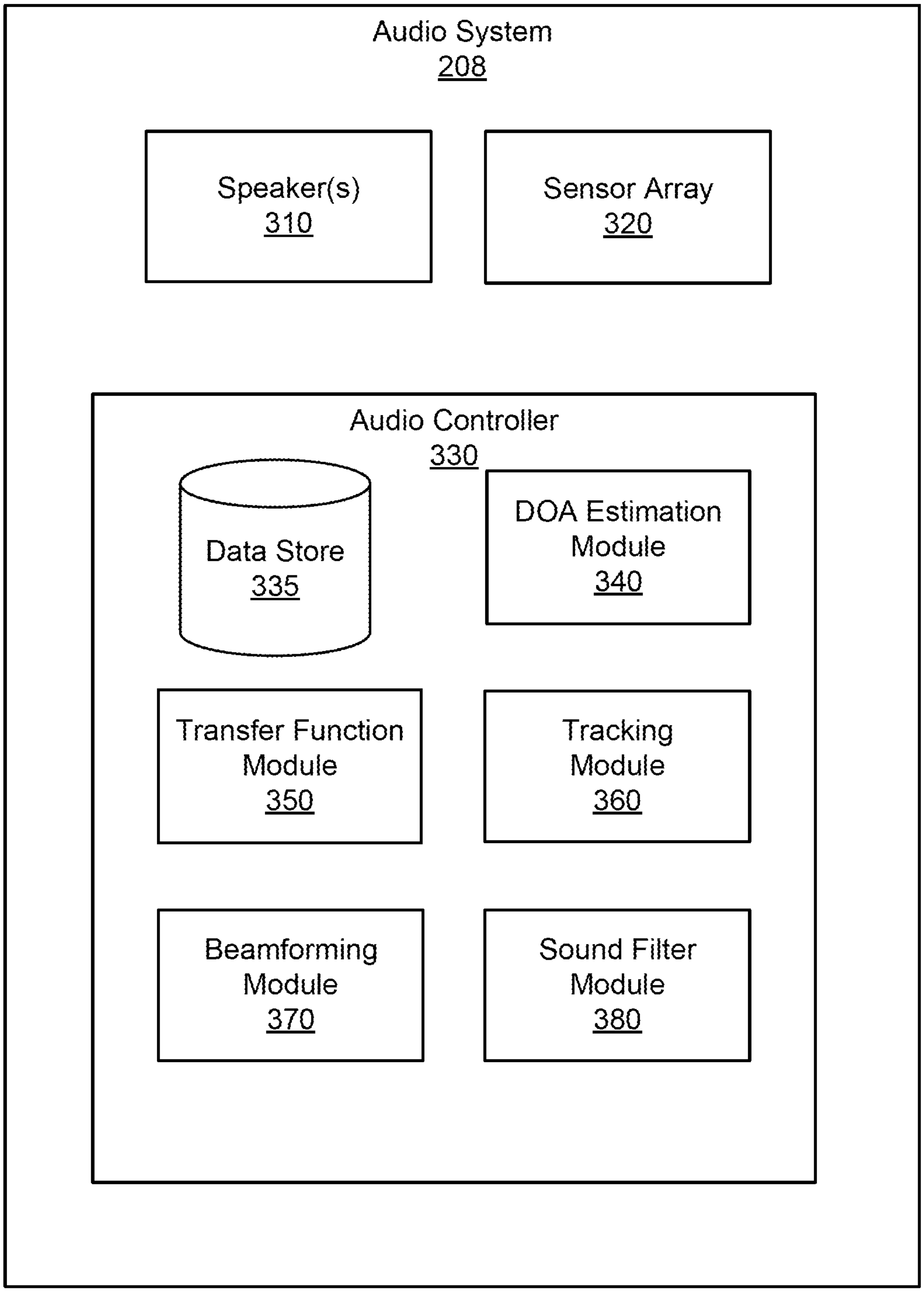
FIG. 3 is a block diagram of an audio system, in accordance with one or more embodiments.

FIG. 3 is a block diagram of an audio system, in accordance with one or more embodiments. In some embodiments, the audio system 208 generates one or more acoustic transfer functions for a user. The audio system 208 may then use the one or more acoustic transfer functions to generate audio content for the user. In the embodiment of FIG. 3, the audio system 208 includes one or more speakers, a sensor array 320, and an audio controller 330. Some embodiments of the audio system 208 have different components than those described here. Similarly, in some cases, functions can be distributed among the components in a different manner than is described here.

In various embodiments, the audio system 208 further includes one or more acoustic devices, which are configured to mitigate wind noise captured by the sensor array 320. The sensor array 320 may include a plurality of acoustic sensors that detect sound within a local area surrounding the sensor array 320. The sensor array 320 may include a plurality of acoustic sensors that detect sounds within a local area surrounding the sensor array 320. The sensor array 320 may include a plurality of acoustic sensors that each detect air pressure variations of a sound wave and convert the detected sounds into an electronic format (analog or digital). The plurality of acoustic sensors may be positioned in an acoustic device, in a wristband system 100, on a headset, on a user (e.g., in an ear canal of the user), on a neckband, or some combination thereof. An acoustic sensor may be, e.g., a microphone, a vibration sensor, an accelerometer, or any combination thereof. In some embodiments, the sensor array 320 is configured to monitor the audio content generated by the one or more speakers using at least some of the plurality of acoustic sensors. Increasing the number of sensors may improve the accuracy of information (e.g., directionality) describing a sound field produced by the one or more speakers 310 and/or sound from the local area.

The audio controller 330 processes information from the sensor array that describes sounds detected by the sensor array. The audio controller 330 may comprise a processor and a computer-readable storage medium. The audio controller 330 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers, or some combination thereof.

The audio controller 330 controls operation of the audio system 208. In the embodiment of FIG. 3, the audio controller 330 includes a data store 335, a DOA estimation module 340, a transfer function module 350, a tracking module 360, a beamforming module 370, and a sound filter module 380. The audio controller 330 may be located inside a wristband system, in some embodiments. Some embodiments of the audio controller 330 have different components than those described here. Similarly, functions can be distributed among the components in different manners than described here. For example, some functions of the controller may be performed external to the wristband system. The user may opt in to allow the audio controller 330 to transmit data captured by the wristband system to systems external to the wristband system, and the user may select privacy settings controlling access to any such data.

The data store 335 stores data for use by the audio system 208. Data in the data store 335 may include sounds recorded in the local area of the audio system 208, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 208, or any combination thereof.

The user may opt-in to allow the data store 335 to record data captured by the audio system 208. In some embodiments, the audio system 208 may employ always on recording, in which the audio system 208 records all sounds captured by the audio system 208 in order to improve the experience for the user. The user may opt in or opt out to allow or prevent the audio system 208 from recording, storing, or transmitting the recorded data to other entities.

The DOA estimation module 340 is configured to localize sound sources in the local area based in part on information from the sensor array 320. Localization is a process of determining where sound sources are located relative to the user of the audio system 208. The DOA estimation module 340 performs a DOA analysis to localize one or more sound sources within the local area. The DOA analysis may include analyzing the intensity, spectra, and/or arrival time of each sound at the sensor array 320 to determine the direction from which the sounds originated. In some cases, the DOA analysis may include any suitable algorithm for analyzing a surrounding acoustic environment in which the audio system 208 is located.

For example, the DOA analysis may be designed to receive input signals from the sensor array 320 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 320 received the direct-path audio signal. The determined angle may then be used to identify the DOA for the received input signal. Other algorithms not listed above may also be used alone or in combination with the above algorithms to determine DOA.

In some embodiments, the DOA estimation module 340 may also determine the DOA with respect to an absolute position of the audio system 208 within the local area. The position of the sensor array 320 may be received from an external system (e.g., some other component of a wristband system, an artificial reality console, a mapping server, a position sensor. The external system may create a virtual model of the local area, in which the local area and the position of the audio system 208 are mapped. The received position information may include a location and/or an orientation of some or all of the audio system 208 (e.g., of the sensor array 320). The DOA estimation module 340 may update the estimated DOA based on the received position information.

The transfer function module 350 is configured to generate one or more acoustic transfer functions. Generally, a transfer function is a mathematical function giving a corresponding output value for each possible input value. Based on parameters of the detected sounds, the transfer function module 350 generates one or more acoustic transfer functions associated with the audio system 208. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 320. Accordingly, for a sound source there is a corresponding transfer function for each of the acoustic sensors in the sensor array 320. And collectively the set of transfer functions is referred to as an ATF. Accordingly, for each sound source there is a corresponding ATF. Note that the sound source may be, e.g., someone or something generating sound in the local area, the user, or the one or more speakers. The ATF for a particular sound source location relative to the sensor array 320 may differ from user to user due to a person's anatomy (e.g., ear shape, shoulders, etc.) that affects the sound as it travels to the person's ears. Accordingly, the ATFs of the sensor array 320 are personalized for each user of the audio system 208.

In some embodiments, the transfer function module 350 determines one or more HRTFs for a user of the audio system 208. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 350 may determine HRTFs for the user using a calibration process. In some embodiments, the transfer function module 350 may provide information about the user to a remote system. The user may adjust privacy settings to allow or prevent the transfer function module 350 from providing the information about the user to any remote systems. The remote system determines a set of HRTFs that are customized to the user using, e.g., machine learning, and provides the customized set of HRTFs to the audio system 208.

The tracking module 360 is configured to track locations of one or more sound sources. The tracking module 360 may compare current DOA estimates and compare them with a stored history of previous DOA estimates. In some embodiments, the audio system 208 may recalculate DOA estimates on a periodic schedule, such as once per second, or once per millisecond. The tracking module may compare the current DOA estimates with previous DOA estimates, and in response to a change in a DOA estimate for a sound source, the tracking module 360 may determine that the sound source moved. In some embodiments, the tracking module 360 may detect a change in location based on visual information received from the headset or some other external source. The tracking module 360 may track the movement of one or more sound sources over time. The tracking module 360 may store values for a number of sound sources and a location of each sound source at each point in time. In response to a change in a value of the number or locations of the sound sources, the tracking module 360 may determine that a sound source moved. The tracking module 360 may calculate an estimate of the localization variance. The localization variance may be used as a confidence level for each determination of a change in movement.

The beamforming module 370 is configured to process one or more ATFs to selectively emphasize sounds from sound sources within a certain area while de-emphasizing sounds from other areas. In analyzing sounds detected by the sensor array 320, the beamforming module 370 may combine information from different acoustic sensors to emphasize sound associated from a particular region of the local area while deemphasizing sound that is from outside of the region. The beamforming module 370 may isolate an audio signal associated with sound from a particular sound source from other sound sources in the local area based on, e.g., different DOA estimates from the DOA estimation module 340 and the tracking module 360. The beamforming module 370 may thus selectively analyze discrete sound sources in the local area. In some embodiments, the beamforming module 370 may enhance a signal from a sound source. For example, the beamforming module 370 may apply sound filters which eliminate signals above, below, or between certain frequencies. Signal enhancement acts to enhance sounds associated with a given identified sound source relative to other sounds detected by the sensor array 320.

The sound filter module 380 determines sound filters for the one or more speakers 310. In some embodiments, the sound filters cause the audio content to be spatialized, such that the audio content appears to originate from a target region. The sound filter module 380 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 380 calculates one or more of the acoustic parameters. In some embodiments, the sound filter module 380 requests the acoustic parameters from a mapping server.

The sound filter module 380 provides the sound filters to the one or more speakers. In some embodiments, the sound filters may cause positive or negative amplification of sounds as a function of frequency.

Figure 4:
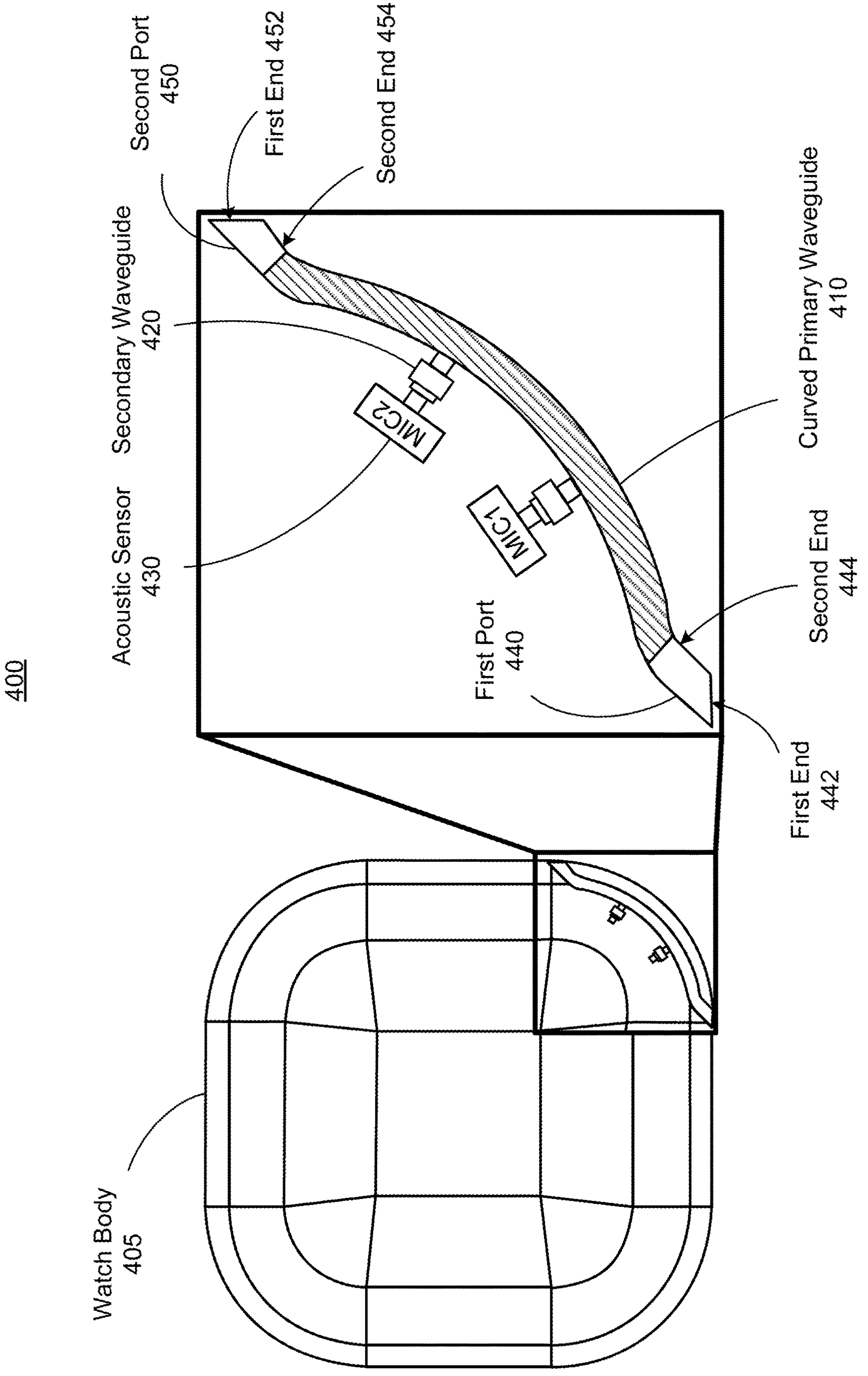
FIG. 4 is a perspective view of an architecture of a port of an acoustic device, in accordance with one or more embodiments.

FIG. 4 is a perspective view of an architecture of a port of an acoustic device, in accordance with one or more embodiments. The acoustic device, as discussed above in relation to FIG. 1A, is a structure configured to mitigate the level of wind noise captured by a sensor array. The sensor array includes a plurality of acoustic sensors 430, which are configured to capture audio content from the environment surrounding the acoustic device. In various embodiments, the acoustic device is included within a wearable device, such as a watch body 104 of wristband system 100. Referring to FIG. 4, an example of the acoustic device is implemented within a square watch body 405 with rounded edges. In this example, the acoustic device is located along a periphery of a rounded edge at the bottom right of the watch body 405. In other embodiments, the acoustic device may also be implemented in a watch body with a circular design.

The acoustic device includes a curved primary waveguide 410 with opposing ports and a plurality of secondary waveguides 420. In the illustrated example, the curved primary waveguide is parallel to the periphery of the device. The curved primary waveguide 410 includes a first port 440 and a second port 450, which are straight tubes. The first port 440 and second port 450 each include a first and second end. The first port 440 and second port 450 may be the ports 122 described in FIGS. 1A and 1B. The first end 442 of the first port 440 is open to a local area, configured to receive airflow from the local area based in part on an orientation of the acoustic device with respect to wind direction, and the second end 444 of the second port is coupled to a first end of the curved primary waveguide 410, configured to direct airflow from the local area to the curved primary waveguide. The first end 452 of the second port 450 is open to a local area, configured to receive airflow from the local area based in part on an orientation of the acoustic device with respect to wind direction, and the second end 454 of the second port is coupled to a second end of the curved primary waveguide 410, configured to direct airflow from the local area to the curved primary waveguide 410. The airflow from the local area may include sound pressure waves from a sound source and turbulent pressure waves, such as wind. The port in which airflow enters or exits the curved primary waveguide 410 is based in part on an orientation of the wearable device with respect to wind direction. In some embodiments, one or more of the first port 440 and second port 450 may include a mesh, which enhances the acoustic device's reliability against dust and debris.

The curved primary waveguide 410 is coupled to the plurality of acoustic sensors 430 via the plurality of secondary waveguides 420. The plurality of secondary waveguides is configured to transport sound from the curved primary waveguide 410 to a plurality of acoustic sensors. Each secondary waveguide 420 of the plurality of secondary waveguides includes a first end and a second end. The first end of the secondary waveguide 420 is coupled to a respective portion of the curved primary waveguide 410, and the second end of the secondary waveguide is coupled to a respective acoustic sensor 430. For example, if there are two secondary waveguides, each secondary waveguide includes its own acoustic sensor, and couples to a different location of the curved primary waveguide at a different location. The configuration of the multiple ports 440, 450 and secondary waveguides 420 further enhances occlusion reliability of the acoustic device as the probability of blocking all openings is smaller than conventional single port designs.

Based in part on orientation of the acoustic device relative to wind direction, at least one of the ports of the primary waveguide acts as an input port and receives airflow. The received airflow may include, e.g., sound pressure waves from a sound source and turbulent pressure waves (e.g., wind). The airflow travels through the curved primary waveguide 410 toward an output port (i.e., the opposite port of the entrance port). As the airflow travels through the curved primary waveguide portions of the sound pressure waves and the turbulent pressure waves are branch off into the secondary waveguides 420 and are detected by their respective acoustic sensors, while the remaining portion of the airflow travels to and exits at the output port. The secondary waveguides are positioned such that most of the sound pressure waves and a relatively small amount of the turbulent pressure waves propagate from the curved primary waveguide into the secondary waveguides, with most of the turbulent pressure waves proceeding through about the output port. This configuration helps to enhance signal to noise ratio (SNR) at each acoustic sensor. In some embodiments, the SNR at a particular acoustic sensor varies based on orientation of the acoustic device relative to wind direction. As such, a controller may monitor signals from each acoustic sensor and select signals from the acoustic sensor with the highest SNR for further use (e.g., recording audio).

It should be noted that a performance of the acoustic device is based in part on the arc of the curved primary waveguide, where the level of wind mitigation is increased if the curvature of the curved primary waveguide 410 is deeper. In some embodiments, the placement of the secondary waveguides is based in part on maximizing SNR performance of the acoustic sensors over a set of wind directions. In addition, while FIG. 4 illustrates two acoustic sensors included in the acoustic device, the acoustic device may include more than two acoustic sensors 430 in other embodiments, where increasing the number of acoustic sensors in the acoustic device increases the probability of an acoustic sensor being coupled to a portion of the primary waveguide with low turbulent pressure.

As described in FIG. 3, the audio system 208 includes an audio controller. The audio controller can select a signal from an acoustic sensor, of the at least two acoustic sensors, having the least amount of wind noise. Additionally, in some embodiments, when there is minimal wind noise, the at least two acoustic sensors may be used for beamforming. The audio controller is further described below in conjunction with FIG. 6.

FIG. 5A through 5D are conceptual diagrams that illustrate an example with two acoustic sensors subject to different wind directions, according to one or more embodiments. Based in part on the orientation of the acoustic device relative to the wind direction, at least one of the ports of the primary waveguide acts as an input port and receives airflow. The received airflow may include sound pressure waves from a sound source and turbulent pressure waves, such as wind. It should be noted that the measured level of wind noise, at a particular acoustic sensor varies based in part on the orientation of the acoustic device with respect to wind direction. In some embodiments, the set of potential wind directions is 360 degrees. For the following examples illustrated by FIGS. 5A through 5D, the direction of wind relative to the watch body 405 will be described using a polar coordinate system. In addition, the level of wind noise in audio signals is determined using the signal-to-noise ratio (SNR) measurement, which indicates the strength of the target signal with respect to background noise, such as wind noise.

Figure 5A:
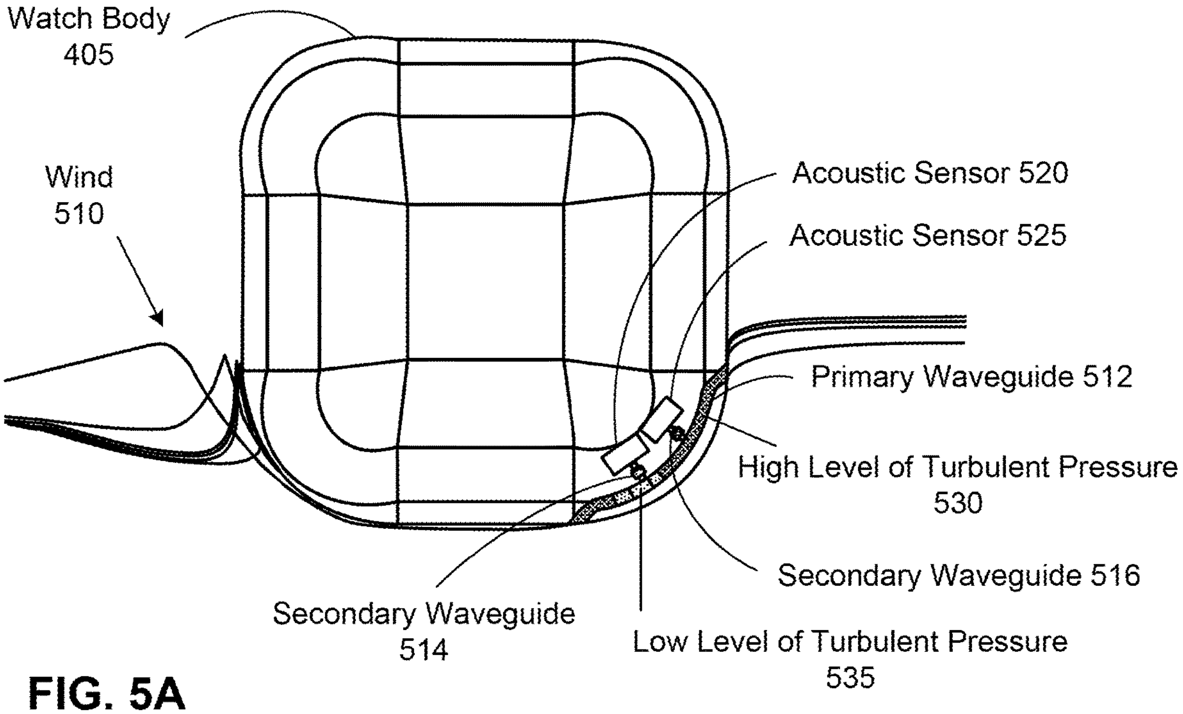
FIG. 5A through 5D are conceptual diagrams that illustrate an example with two acoustic sensors subject to different wind directions, in accordance with one or more embodiments.

FIG. 5A illustrates an embodiment in which the wind direction with respect to the watch body is 0 degrees. In FIG. 5A, wind 510 approaches the right side of the watch body 405 at a ninety-degree angle. The varying fill patterns shown within the primary waveguide 512 indicate varying levels of wind noise. A first portion of the curved primary waveguide 512 and a coupled first secondary waveguide 516 experience a high level of turbulent pressure 530 caused by wind 510. Accordingly, the audio signal output by an acoustic sensor 525 coupled to the first secondary waveguide 516 may have a high level of wind noise, represented by a low SNR. In contrast, a second secondary waveguide 514 experiences a lower level of turbulent pressure 535, and the audio signal captured by an acoustic sensor 520 coupled to the second secondary waveguide may reflect a lower level of wind noise, represented by a higher SNR.

Figure 5B:
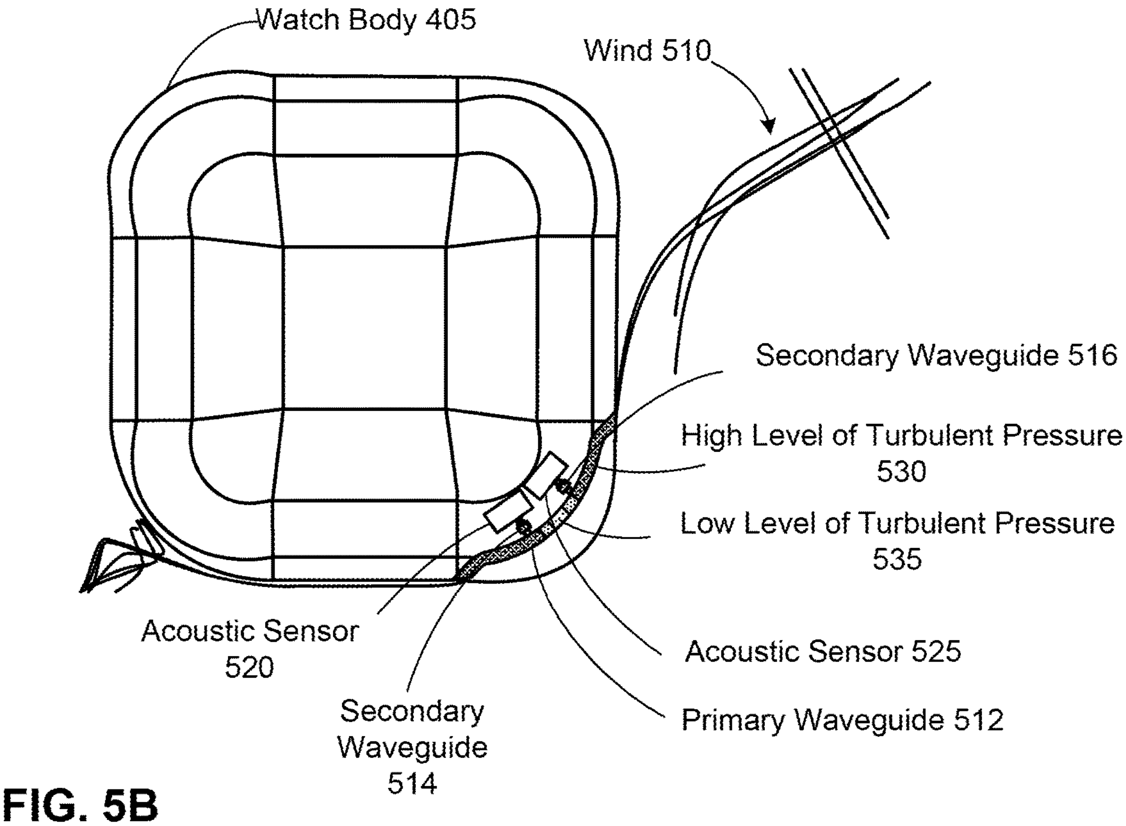
Figure 5C:
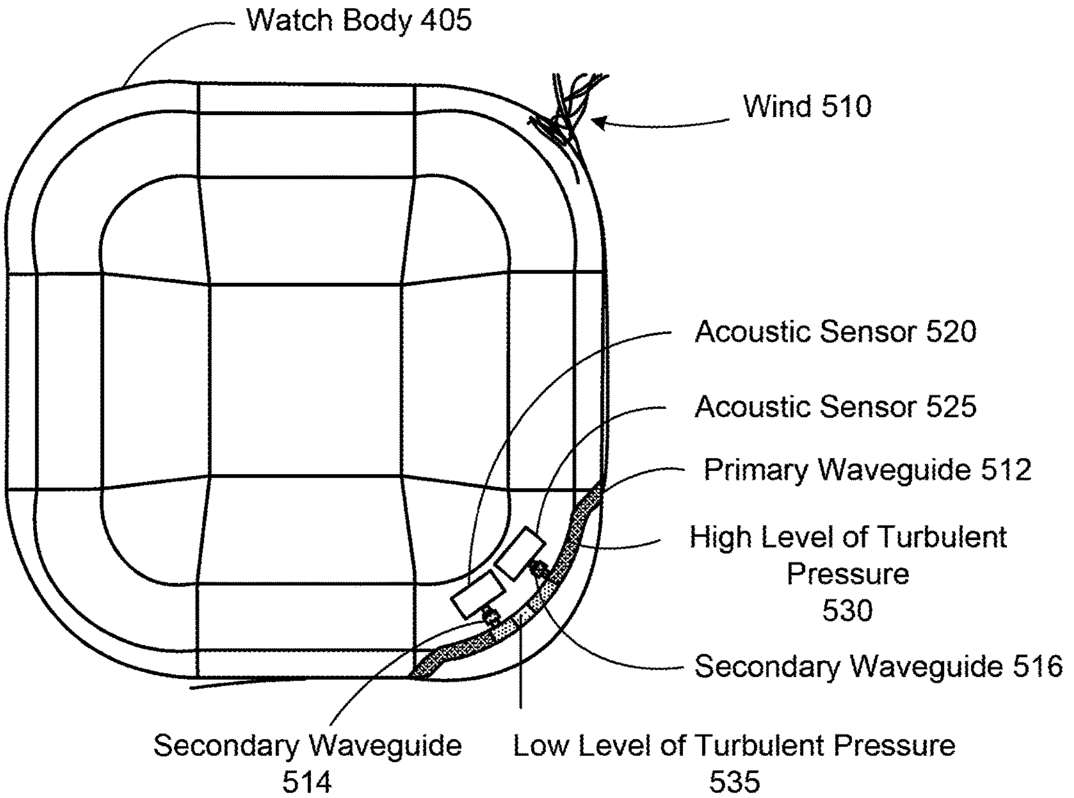

FIG. 5B illustrates an embodiment in which the wind direction with respect to the watch body is 30 degrees. In contrast with the earlier example illustrated by FIG. 5A, both acoustic sensors 520, 525 experience a high level of turbulent pressure 530 caused by the wind 510. FIG. 5C illustrates an embodiment in which the wind direction with respect to the watch body is 240 degrees. In this example, a first acoustic sensor 520 experiences a lower level of turbulent pressure 535 than a second acoustic sensor 525. Accordingly, the first acoustic sensor 520 will produce a higher SNR measurement.

Figure 5D:
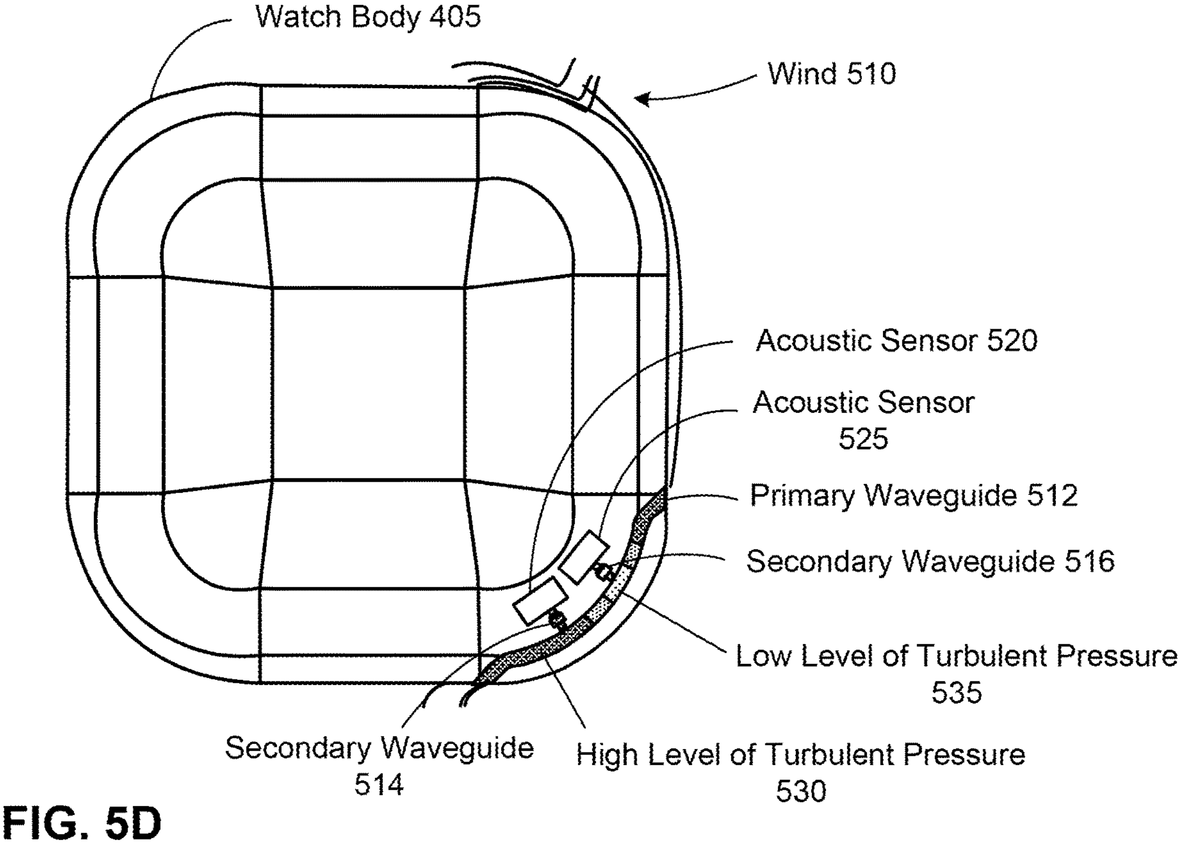

FIG. 5D illustrates an embodiment in which the wind direction with respect to the watch body is 270 degrees. For this embodiment, a first acoustic sensor 520 experiences a higher level of turbulent pressure 530 compared to a second acoustic sensor 525. Accordingly, the second acoustic sensor 525 will produce a higher SNR measurement. It should be noted that increasing the number of acoustic sensors coupled to the primary curved waveguide accordingly increases a probability that one or more of the plurality of acoustic sensors will experience a low level of turbulent pressure at every wind direction.

Figure 6:
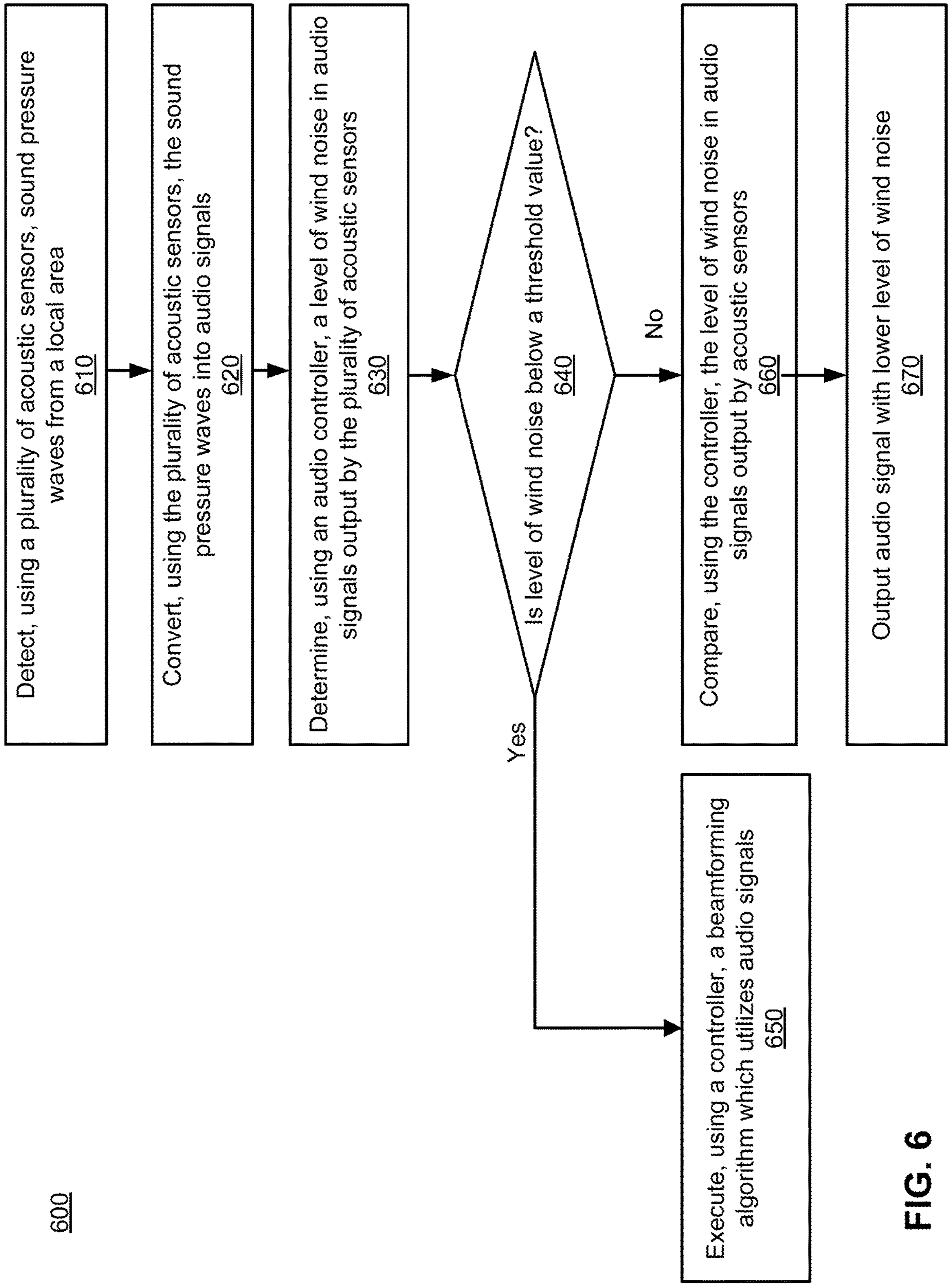
FIG. 6 is a flowchart illustrating a process for monitoring a level of wind noise experienced by an acoustic device, in accordance with one or more embodiments.

FIG. 6 is a flowchart illustrating a process for monitoring a level of wind noise experienced by an acoustic device, in accordance with one or more embodiments. The process shown in FIG. 6 may be performed by components of an audio system 208. Other entities may perform some or all of the steps in FIG. 6 in other embodiments. Embodiments may include different and/or additional steps, or perform the steps in different orders.

As described in detail above, the audio system 208 includes a sensor array 320 that includes plurality of acoustic sensors, one or more speakers 310, and an audio controller 330. The plurality of acoustic sensors detects 610 sound pressure waves and turbulent pressure waves from a local area surrounding the acoustic device. The plurality of acoustic sensors converts 620 the detected sound pressure waves and turbulent pressure waves into audio signals. The converted audio signals are analyzed by an audio controller 330. The audio controller determines 630 a level of wind noise in audio signals output by the plurality of acoustic sensors. The level of wind noise in audio signals is determined using the signal-to-noise ratio (SNR) measurement, which indicates the strength of the target signal with respect to background noise (e.g., wind noise).

By including a plurality of acoustic sensors in the acoustic device, it allows for a signal to be selected from an acoustic sensor, of the at least two acoustic sensors, having the least amount of wind noise in a windy environment. To further optimize the usage of the acoustic device, the plurality of acoustic sensors can also be utilized for beamforming. The audio controller 330 determines 640 whether the level of wind noise is lower than a predefined threshold value by comparing the level of wind noise (e.g., based on the measured SNR of the audio signal) to a threshold value. In response to determining that the level of wind noise of the audio signal is greater the threshold value, the audio controller is configured to compare 660 the level of wind noise in the audio signals output by the plurality of acoustic sensors. The audio controller determines which audio signal from the plurality of audio signals output by the plurality of acoustic sensors has the lowest level of wind noise. The lowest level of wind noise is determined by comparing the measured SNR of the plurality of audio signals. The audio controller is configured to output 670 the audio signal with the lowest level of wind noise.

In response to determining that the level of wind noise of the audio signal is below the predefined threshold value, the audio controller executes 650 a beamforming module that utilizes the audio signals from the plurality of acoustic sensors to perform beamforming functions. The beamforming module 370 analyzes sound pressure waves detected by the plurality of acoustic sensors of the sensor array 320. In analyzing sounds detected by the sensor array 320, the beamforming module 370 may combine information from different acoustic sensors to amplify audio associated from a target region of the local area, while dampening sound from outside the target region. Additionally, the beamforming module 370 may isolate or enhance an audio signal associated with audio from a particular sound source from other sound sources in the local area. By utilizing the acoustic sensors for other purposes, it allows for the optimization and the mitigation of wind from multiple directions. In some embodiments, other types of operations using multiple sensors of the plurality of acoustic sensors may be performed.

ADDITIONAL CONFIGURATION INFORMATION

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An acoustic device comprising:

a curved primary waveguide having a first port located at a first end of the curved primary waveguide and a second port at a second end of the curved primary waveguide, the curved primary waveguide configured to direct airflow from a local area that includes sound pressure waves and turbulent pressure waves to a plurality of secondary waveguides; and the plurality of secondary waveguides, each secondary waveguide of the plurality of secondary waveguides configured to direct the sound pressure waves and a portion of turbulent pressure waves to a respective acoustic sensor of a sensor array, wherein each acoustic sensor of the sensor array detects a respective portion of the sound pressure waves and a respective portion of turbulent pressure waves, and a remaining portion of the turbulent pressure waves exits the acoustic device at one of the first port and the second port, and at least one of the detected portions of turbulent pressure waves is lower than the remaining portion the turbulent pressure waves.

2. The acoustic device of claim 1, wherein the first port includes:

a first end open to a local area, the first end configured to receive airflow from the local area based in part on an orientation of the acoustic device with respect to wind direction; and a second end coupled to the end of the curved primary waveguide, the second end configured to direct airflow from the local area to the curved primary waveguide.

3. The acoustic device of claim 1, wherein the second port includes:

a first end open to a local area, the first end configured to receive airflow from the local area based in part on an orientation of the acoustic device with respect to wind direction; and a second end coupled to the end of the curved primary waveguide, the second end configured to direct airflow from the local area to the curved primary waveguide.

4. The acoustic device of claim 1, wherein the first port and second port are straight tubes.

5. The acoustic device of claim 1, wherein each secondary waveguide of the plurality of secondary waveguides includes:

a first end, the first end coupled to the curved primary waveguide between the first port and second port of the curved primary waveguide; and a second end, the second end coupled to an acoustic sensor.

6. A wearable device comprising:

an acoustic device comprising:

a curved primary waveguide having a first port located at a first end of the curved primary waveguide and a second port at a second end of the curved primary waveguide, the curved primary waveguide configured to direct airflow from a local area that includes sound pressure waves and turbulent pressure waves to a plurality of secondary waveguides; and the plurality of secondary waveguides, each secondary waveguide of the plurality of secondary waveguides configured to direct the sound pressure waves and a portion of turbulent pressure waves to a respective acoustic sensor of a sensor array, wherein each acoustic sensor of the sensor array detects a respective portion of the sound pressure waves and a respective portion of turbulent pressure waves, and a remaining portion of the turbulent pressure waves exit the acoustic device at one of the first port and the second port, and at least one of the detected portions of turbulent pressure waves is lower than the remaining portion the turbulent pressure waves; and an audio controller coupled to the sensor array, the audio controller configured to monitor levels of wind noise detected in audio signals output by each of the plurality of acoustic sensors.

7. The wearable device of claim 6, wherein the first port includes:

a first end open to a local area, the first end configured to receive airflow from the local area based in part on an orientation of the wearable device with respect to wind direction; and a second end coupled to the end of the curved primary waveguide, the second end configured to direct airflow from the local area to the curved primary waveguide.

8. The wearable device of claim 6, wherein the second port includes:

a first end coupled to the end of the curved primary waveguide, the first end configured to direct airflow from the local area to the curved primary waveguide; and a second end open to a local area, the second end configured to receive airflow from the local area based in part on an orientation of the wearable device with respect to wind direction.

9. The wearable device of claim 6, wherein the first port and second port are straight tubes.

10. The wearable device of claim 6, wherein the acoustic device is located on a periphery of the wearable device.

11. The wearable device of claim 6, wherein the curved primary waveguide is parallel to a periphery of the wearable device.

12. The wearable device of claim 6, wherein each secondary waveguide of the plurality of secondary waveguides includes:

a first end, the first end coupled to the curved primary waveguide; and a second end, the second end coupled to an acoustic sensor.

13. The wearable device of claim 6, wherein the audio controller is further configured to:

determine a level of wind noise in the audio signals output by each acoustic sensor from the sensor array; and in response to the level of wind noise being greater than a predefined threshold:

select a signal of the audio signals with a lower level of wind noise; and in response to the level of wind noise being lower than a predefined threshold;

execute a beamforming algorithm, wherein the beamforming algorithm uses the audio signals output by each acoustic sensor.

14. The wearable device of claim 13, wherein the audio controller is further configured to determine the level of wind noise in the audio signals by calculating a signal-to-noise ratio of the audio signals output by a respective acoustic sensor.

15. An audio system comprising:

one or more acoustic devices, an acoustic device comprising:

a curved primary waveguide having a first port located at a first end of the curved primary waveguide and a second port at a second end of the curved primary waveguide, the curved primary waveguide configured to direct airflow from a local area that includes sound pressure waves and turbulent pressure waves to a plurality of secondary waveguides; and the plurality of secondary waveguides, each secondary waveguide of the plurality of secondary waveguides configured to direct the sound pressure waves and a portion of turbulent pressure waves to a respective acoustic sensor of a sensor array, wherein each acoustic sensor of the sensor array detects a respective portion of the sound pressure waves and a respective portion of turbulent pressure waves, and a remaining portion of the turbulent pressure waves exit the acoustic device at one of the first port and the second port, and at least one of the detected portions of turbulent pressure waves is lower than the remaining portion the turbulent pressure waves; and an audio controller coupled to the sensor array, the audio controller configured to monitor levels of wind noise detected in audio signals output by each of the plurality of acoustic sensors.

16. The audio system of claim 15, wherein the first port includes:

a first end open to a local area, the first end configured to receive airflow from the local area based in part on an orientation of the acoustic device with respect to wind direction; and a second end coupled to the end of the curved primary waveguide, the second end configured to direct airflow from the local area to the curved primary waveguide.

17. The audio system of claim 15, wherein the second port includes:

a first end coupled to the end of the curved primary waveguide, the first end configured to direct airflow from the local area to the curved primary waveguide; and a second end open to a local area, the second end configured to receive airflow from the local area based in part on an orientation of the acoustic device with respect to wind direction.

18. The audio system of claim 15, wherein each secondary waveguide of the plurality of secondary waveguides includes:

a first end, the first end coupled to the curved primary waveguide; and a second end, the second end coupled to an acoustic sensor.

19. The audio system of claim 15, wherein the audio controller is further configured to:

determine a level of wind noise in the audio signals output by each acoustic sensor from the sensor array;

in response to the level of wind noise being greater than a predefined threshold:

select a signal of the audio signals with a lower level of wind noise; and in response to the level of wind noise being lower than a predefined threshold;

execute a beamforming algorithm, wherein the beamforming algorithm uses the audio signals output by each acoustic sensor.

20. The audio system of claim 19, wherein the audio controller is further configured to determine the level of wind noise in the audio signals by calculating a signal-to-noise ratio of the audio signals output by a respective acoustic sensor.

* * * * *